(12) United States Patent
Pinter

(10) Patent No.: US 8,119,005 B1
(45) Date of Patent: Feb. 21, 2012

(54) METHOD AND APPARATUS FOR PARTIAL DESALINATION OF A CONCENTRATED SALT SOLUTION

(76) Inventor: Gabriel George Pinter, Ellicott City, MD (US)

( * ) Notice: Subject to any disclaimer, the term of this patent is extended or adjusted under 35 U.S.C. 154(b) by 0 days.

(21) Appl. No.: 12/943,362

(22) Filed: Nov. 10, 2010

Related U.S. Application Data

(60) Provisional application No. 61/272,855, filed on Nov. 12, 2009.

(51) Int. Cl.
*C02F 1/44* (2006.01)
*B01D 63/00* (2006.01)
*B01D 24/00* (2006.01)

(52) U.S. Cl. .................. 210/637; 210/189; 210/321.6; 210/321.87; 210/634; 210/641; 210/660; 210/670

(58) Field of Classification Search .................. None
See application file for complete search history.

(56) References Cited

U.S. PATENT DOCUMENTS

| | | | | |
|---|---|---|---|---|
| 3,839,201 A | * | 10/1974 | Miller | 210/637 |
| 5,256,294 A | * | 10/1993 | van Reis | 210/637 |
| 6,274,018 B1 | * | 8/2001 | Hidaka | 204/524 |

OTHER PUBLICATIONS

B. Yang, et al. ("Urea and urine concentrating ability: new insights from studies in mice," Am. J. Physiol. Renal Physiol.; 2005;288:F881-F896.
Knepper et al. in the publication "Concentration of solutes in the renal inner medulla: interstitial hyaluronan as a mechano-osmotic transducer", Am. J. Physiol. Renal Physiol., 2003; 284:F433-F446.
G.G. Pinter, et al. "Two fluid compartments in the renal inner medulla: a view through the keyhole of the concentrating process", Philosophical Transactions of the Royal Society A: 2006;364:1551-1561.
G. G. Pinter, et al., An inner medullary concentrating process actuated by renal pelvic/calyceal muscle contractions: assessment and hypothesis, Nephron Physiology, 2009; vol. 113, pp. 1-6.
Schmidt-Nielsen B. Function of the renal pelvis. In: Comparative Physiology, edited by Kinne RKH, Kinne-Saffran E, and Beyenbach KW. New York: Karger, 1990, vol. 2, p. 103-140.
Schmidt-Nielsen B. "The Renal Concentrating Mechanism in insects and Mammals: a New Hypothesis involving Hydrostatic Pressures", August Krogh Lecture, Am. J. Physiol. Reg. Integr. Comp. Physiol., 1995;268:R1087-1100.

* cited by examiner

*Primary Examiner* — Krishnan S Menon
*Assistant Examiner* — Dirk Bass
(74) *Attorney, Agent, or Firm* — Rosenberg, Klein & Lee

(57) ABSTRACT

A desalination system and method are based on the biological mechanism occurring in the mammalian kidney which utilizes colloid osmotic pressure and hydrostatic pressure to recover diluted salt solution from a concentrated one. The desalination system includes fluidly connected chamber compartments, one of which is filled with a charged substance, for example, a charged colloid polymer, to form a colloid salt solution when filled with the concentrated salt solution. Peripheral chamber compartments are filled with the concentrated salt solution. A system of semi-permeable membranes, not permeable to the charged substance, separate the chambers one from another. The system operates in the filling, equilibration, dilute, and collecting cycles which are controlled by opening and closing of the semi-permeable membranes. Desalination is based on the transfer of water due to osmotic pressure gradient across the membranes and is driven by hydrostatic pressure, thus providing energy efficient process. The charged substance is not consumed during the desalination and may be repeatedly used.

20 Claims, 5 Drawing Sheets

METHOD AND APPARATUS FOR PARTIAL DESALINATION OF A CONCENTRATED SALT SOLUTION

REFERENCES TO RELATED PATENT APPLICATIONS

This Utility patent application is based on the Provisional Patent Application No. 61/272,855 filed on 12 Nov. 2009.

FIELD OF THE INVENTION

The present invention is directed to desalination of salt solutions; and more in particular, to a process and system for extracting dilute fluids from more concentrated fluids by a mechanism employing the Gibbs-Donnan phenomenon which governs the behavior of charged particles near a semipermeable membrane.

Even more in particular, the present invention is directed to a desalination system, the principle of operation of which are based on the biological mechanism which takes place in mammalian kidneys and which utilizes colloid osmotic pressure and a controlled hydrostatic pressure to recover a dilute salt solution from a concentrated salt solution to salvage water for an organism.

The present invention is further directed to a desalination system using three fluid chamber compartments separated by semipermeable membranes, one of which is exclusively water permeable, and another is water and salt permeable. One of the chamber compartments contain a charged colloid. The semi-permeable membranes are opened or closed in a predetermined timing manner to attain absorption of water from the chamber compartment filled with the concentrated salt solution into the chamber compartment filled with the charged colloid polymer, thereby obtaining a diluted salt solution owing to the increased volume of water in the colloid containing chamber compartment.

The present invention is also directed to a system for desalination of a concentrated salt solution where a number of desalination units are cascaded to further gradually desalinate the diluted salt solution obtained in the upstream desalination unit. The number of the cascaded desalination units is determined in accordance with a specific application of the final solution.

BACKGROUND OF THE INVENTION

Supply of fresh water versus the water consumption rate is a critical worldwide issue. While water demand for food, industry and the population is on the rise, the supply of fresh water is on the decrease. Lack of fresh water may reduce economic development and lower living standards. Therefore, desalination processes and systems which produce either partially desalinated or fresh water, both from sea water and/or from other sources, have drawn an increased attention in the scientific community in search for the development of additional water supplies.

Various desalination systems have been developed. However, no system is known to be patterned after the urine concentrating and diluting functions of the mammalian kidneys to reproduce this biological activity.

Multiple studies of kidney function, provide accumulated evidence for different mechanisms which contribute to the urine concentrating process. It was determined that the inner medulla (compartment of kidney) plays an important role in concentrating the urine, yet many details of the local concentrating mechanisms remained unexplained. While the mechanism of the accumulation of urea has been clarified in B. Young, et al. ("Urea and urine concentrating ability: new insights from studies in mice," Am. J. Physiol. Renal Physiol.; 2005; 288:F881-F896), the model of the comprehensive mechanism for the concentrating process was not borne out by experimental results.

Further, observations have been made by B. Schmidt-Nielsen in "Function of the Renal Pelvis", Kinne R K H, Kinne-Safran E, Beyenbach K W (eds): Comparative Physiology, New York, Karger, 1990, pp. 103-140; "The Renal Concentrating Mechanism in insects and Mammals: a New Hypothesis involving Hydrostatic Pressures", August Krogh Lecture, Am. J. Physiol. Reg. Integr. Comp. Physiol., 1995; 268:R1087-1100, etc., showing that absence of rhythmic contractions of the renal pelvic muscles is associated with a decrease of the solute concentration in the inner medulla Further, Knepper et al. in the publication "Concentration of solutes in the renal inner medulla: interstitial hyaluronan as a mechano-osmotic transducer", Am. Physiol. Renal Physiol., 2003; 284:F433-F446, proposed that a macromolecule, e.g. hyaluronan (HA), plays a role of a mechano-osmotic transducer in the process.

The role of macromolecules in the inner medulla was discussed by the Applicant in G. G. Pinter, et al. "Two fluid compartments in the renal inner medulla: a view through the keyhole of the concentrating process", Philosophical Transactions of the Royal Society A: 2006; 364:1551-1561. In this publication, the authors argued that by considering the thermodynamic equivalence between mechanical and osmotic work, the work exerted by the pelvic muscles seemed disproportionally small to account for the increased solute concentration occurring in the inner medulla. It was also proposed that in the inner medullary interstitium of the mammalian kidney, there are two fluid compartments, specifically the HA (hyaluronan) compartment and the EPA (extravascated plasma albumin) compartment. Although these compartments are not separated by a membrane, the separation is the result of molecular exclusion. Distribution of ions and water between these compartments is determined by the Gibbs-Donnan mechanism.

As the result of research conducted on the ability of the mammalian kidney to excrete metabolic waste products in varying volumes of water as either concentrated or dilute urine, the Applicant developed a hypothesis which provides a possible resolution of the discrepancy between disproportionally small pelvic muscles work for the increased solute concentration in the prior studies. When the osmotic concentration of the urine is different from the plasma, urine production requires osmotic work. The major part of this work is carried out by specialized cellular barriers that actively and unidirectionally transport sodium therethrough.

The newly proposed mechanism is presented in G. G. Pinter, et al., "An inner medullary concentrating process actuated by renal pelvic/calyceal muscle contractions: assessment and hypothesis, Nephron Physiology, 2009; Vol. 113, pages 1-6. In accordance with the new findings, water extraction is accomplished by a colloid osmotic mechanism and hydrostatic pressure. There are three essential features of the proposed mechanism which include:

(1) The fluid compartmental structure of the inner medullary interstitium. Owing to molecular exclusion, negatively charged macromolecules, i.e. hyaluronan and extravasated plasma albumin, form separate compartments, e.g. HA and EPA compartments. Distribution of ions and water between the HA and EPA compartments is determined by Gibbs-Donnan relationship (which will be discussed further herein);

(2) NaCl in high concentration in the inner medulla conditioned by the outer medullary counter-current processes significantly reduces the equilibrium colloid osmotic pressure between the HA and EPA compartments; and (3) Urea, accumulated by a special transport mechanism, increases the mobility of water molecules and the flexibility of the HA fibrils by loosening hydrogen bonds.

These features suggest that rhythmic small pressure increases of the pelvic/calycle muscles squeeze the diluted fluid out of the HA compartment and, at the same time, accelerate the outflow of fluid and albumin into the ascending vasa recta from the EPA compartment. Further, these features suggest a mechanism for the phenomenon that living organisms utilize hydrostatic pressure generated by the muscle contractions in water economy, namely, concentrating and diluting by the fluids.

As presented in the G. G. Pinter, et al.'s publication, the concentrating work in the mammalian kidneys is based on a colloid osmotic mechanism described by the Gibbs-Donnan model. This mechanism helps to extract dilute solution from a concentrated one, in a manner that the transfer of water takes place in a direction of a smaller osmotic gradient.

In the Gibbs-Donnan model, the charged colloid necessitates a redistribution of both positive and negative small ions in order to approach electroneutrality between two compartments on opposite sides of a semi-permeable membrane which is permeable to water and small ions but not to colloid molecules. The movement of ions causes osmotic imbalance and consequently water movement that, in turn, disturbs the balance in ion concentrations, whereupon further ion migration takes place. In the absence of an external intervention, relocation of ions and osmotic water redistribution would continue until the compartment containing the charged colloid would absorb practically the entire other compartment.

In models of Gibbs-Donnan equilibrium, such external intervention is usually applied as a hydrostatic pressure on the colloid-containing compartment. At equilibrium, the excess hydrostatic pressure on the colloid-containing side imparts an increase of water potential which is sufficient to balance the higher potential of water on the other side, so that no net movement of water occurs between the two compartments.

Referring to FIG. 1, the physical-chemical model of the Gibbs-Donnan equilibrium process is explained for a two chamber structure which includes chambers 10 and 12. The chamber 10 contains a salt (NaCl) solution 14, and the chamber 12 contains the salt solution 16. The chambers 10 and 12 are separated by a semi-permeable membrane 18.

The solution 14 in the chamber 10 also contains negatively charged colloid molecules 20. The membrane 18 is permeable to both salt and water, but not permeable to the colloid molecules. The volumes of fluid are assumed to be equal on both sides of the membrane 18.

Owing to the negative charges on the colloid molecules 20, the colloid holds an equivalent quantity of $Na^+$ ions in ionic bond. In addition, because of the diffusion of $Cl^-$ ions across the membrane 18, excess anions accumulate in the colloid solution in the chamber 10. The anions are also accompanied by additional $Na^+$ ions.

Ionic equilibrium between the fluid in the chamber 10 and the fluid in chamber 12 is achieved when: (1) the electric charges on both sides of the membrane 18 are neutralized, and (2) the ion products $[Na^+]\cdot[Cl^-]$ are equal between the two sides. When such ionic equilibrium is achieved, the concentration of solutes on the colloid side exceeds that which is on the other side, thereby resulting in osmotic disequilibrium and osmotic water flow into the colloid solution in the chamber 10.

In the Gibbs-Donnan model, this water flow is balanced by a specific hydrostatic pressure, e.g. the equilibrium pressure on the colloid solution wherein both ion equilibrium and osmotic equilibrium are maintained in the model.

As shown in FIG. 1, hydrostatic pressure on the side containing a negatively charged colloid, balances the water potential between both chambers 10 and 12 across the membrane 18 which is permeable to both water and small molecules of ions but not permeable to colloids.

An explicit formulation of the quantitative effect of NaCl concentration on the equilibrium colloid osmotic pressure was derived by D. I. Hitchcock "Some consequences of the theory of membrane equilibria", J. Gen. Physiol; 1925; 9; pp. 97-109, from Donnan's theory of equilibrium which is based on the requirement that the concentrations of diffusible ions at equilibrium conform to the equity of ion products. The formula for calculating the magnitude of the equilibrium pressure is as follows:

$$P=RT[z/n+(z^2+4x^2)^{1/2}-2x] \quad \text{(Eq. 1)}$$

where

P is the equilibrium colloid osmotic pressure in mm Hg;

R is the gas constant in appropriate dimensions;

T is the absolute temperature in Kelvin;

z represents the molal-equivalent concentration of the colloidal anion, n is the number of negative charges of one colloidal molecule, and x is the equilibrium equivalent concentration of the diffusible $Na^+$ and the $Cl^-$ ions, each in the solution on the side of the membrane that does not contain the charged colloid, where their concentrations are equal.

Equation (1) allows two important conclusions to be drawn:

(1) as long as z is not zero, i.e. there is charged colloid in the system, P is positive, i.e. the colloid side absorbs water and, subsequently, salt; and (2) P increases when the difference between the positive term $z/n+(z^2+4x^2)^{1/2}$, which represents the concentration of the fluid containing the colloid, and the negative term $2x$, which stands for the salt concentration of the fluid that does not contain colloid, becomes larger, i.e., either when excess solute enters the colloid solution or dilute fluid passes to the solution not containing colloid. In an interchanging isolated system, in either cases (1) or (2), the salt concentration on the side not containing colloid will become more dilute.

The biological water extraction process accomplished by the colloid osmotic mechanism and hydrostatic pressure discovered by the Applicant which occurs in the mammalian kidneys is energetically a low consuming process. However, no mechanical system for desalination of fluids has ever been built based on its principles.

Therefore, it is desirable to use the newly discovered inner medullary concentrating process in which water extraction is accomplished by a colloid osmotic mechanism and hydrostatic pressure in a mechanical desalination system.

SUMMARY OF THE INVENTION

It is therefore an object of the present invention to provide a desalination system based on a biological mechanism occurring in the mammalian kidney which utilizes colloid osmotic pressure to recover a dilute solution from a concentrated one in an energetically efficient fashion.

It is another object of the present invention to provide a desalination system which includes at least one desalination unit having three fluid chambers separated by reinforced semi-permeable membranes which are opened or closed as required by a specific cycle of the system operation, where one of the chambers is filled with charged colloid to take advantage of the Gibbs-Donnan effect for partial desalination of concentrated salt solutions.

It is another object of the present invention to provide a desalination system which employs a number of desalination units cascaded for gradual desalination of partially desalinated product of each upstream desalination unit to result in almost fresh water at the output of the final desalination unit.

The present invention, in one aspect, constitutes a system for desalination of a salt solution implemented with a single desalination unit or with a chain of desalination units cascaded for gradual desalination of the original concentrated salt solution. Each desalination unit includes a central chamber compartment, a first peripheral chamber compartment having fluid communication with the central chamber compartment through a first fluid passage, and a second peripheral chamber compartment in communication with the central chamber compartment through a second fluid passage. A negatively charged colloid polymer is positioned in the central chamber compartment.

A first membrane permeable to salt and water, but not permeable to colloid molecules, is positioned between the first and central chamber compartments to fully overlap with the first fluid passage formed therebetween. A second membrane which is permeable substantially exclusively to water is installed between the second and central chamber compartments to substantially fully overlap with the second fluid passage formed therebetween.

A controller unit is operationally coupled to the first and second membranes to control the "open" and "close" states of the membranes in a predetermined timing fashion, as required by the cycles of the desalination system.

The system operates in sequential filling, equilibration, dilution, and collection modes (cycles) of operation. In the filling mode of operation, the first and second membranes are closed, and the central, first and second chamber compartments are filled with a salt solution to be diluted. The colloidal salt solution is formed in the central chamber compartment from the salt solution and the negatively charged colloid polymer.

In the equilibration mode of operation which follows the filling mode of operation, the first membrane is opened, and the second membrane is closed. In this mode of operation, owing to the Gibbs-Donnan effect, the ionic and pressure equilibrium is established between the salt solution in the first chamber compartment and the colloid salt solution in the central chamber compartment through the first fluid passage.

In the dilution mode of operation which follows the equilibration mode of operation, the first membrane is closed and the second membrane is open. In this mode of operation, owing to the Gibbs-Donnan effect, and the fact that the second membrane is not permeable neither to the salt nor to the colloid molecules, flow of water is created towards the central chamber compartment. The colloid salt solution in the central chamber compartment absorbs water from the salt solution in the second chamber. The water absorption results in expansion of fluid volume and dilution of the salt solution component of the colloidal salt solution in the central chamber compartment.

Further, in the collection mode of operation, which follows the dilution mode of operation, the first and second membranes are closed, and a diluted salt solution, due to an increased hydrostatic pressure in the central chamber compartment, is expelled from the central chamber compartment through the output thereof by gravity assist.

A third membrane which is permeable to salt and water, but not permeable to the colloid molecules, is installed at the bottom of the central chamber compartment. The controller unit which is operationally connected to the third membrane, keeps the third membrane closed in the filling, equilibration, and dilution modes of operation, and opens the third membrane in the collection mode of operation to permit the diluted salt solution exit therethrough.

The chambers of the desalination unit are further equipped with a mechanism for closing and opening of the membranes. This mechanism may include a first wall disposed between the first and central chamber compartments in proximity with the first membrane, a second wall disposed between the second and central chamber compartments in proximity to the second membrane, and a third wall disposed at a bottom of the central chamber compartment in proximity to the third membrane. The first, second and third walls are operationally coupled to the controller unit which controls the displacement thereof, to control opening and closing states of the first, second and third membranes, respectively, as required by the mode of operation of the subject desalination system. Other mechanisms may provide an orderly closing and opening of the membranes in the system and are contemplated for the purposes and objectives of the subject desalination technique.

The central chamber compartment is equipped with an upper wall disposed at the top thereof and which is vertically displaceable in an upward direction in the dilution mode of operation and in a downward direction in the collection mode of operation. The controller unit is operatively coupled to the upper wall for controllable displacement to maintain a required equilibrium pressure in said equilibration mode of operation. The controller unit maintains equilibrium pressure P in the central chamber compartments in accordance with the aforementioned equation (Eq. 1):

$$P=RT[z/n+(z^2+4x^2)^{1/2}-2x],$$

where
R is the gas constant, $R=8.31451.1\ JK^{-1}\ mol^{-1}$,
T is absolute temperature of the colloid salt solution,
x is the equivalent concentration of $Na^+$ or $Cl^-$ ions of said salt solution,
n is the number of negative charges of each negatively charged colloid molecule,
z is the total number of colloidal charges in the CSS, and
z/n is the molar concentration of the colloid.

A collecting vessel fluidly connected to the output of the central chamber compartment is provided to collect the diluted salt solution expelled therefrom.

A plurality of the desalination units may be cascaded each to the other so that the diluted salt solution expelled through the output of the central chamber compartment of an upstream desalination unit is filled into the central, first and second chamber compartments of the respective downstream desalination unit.

Different colloid polymer substances may be used in the central chamber compartment. The molecules of the colloid polymer are to be larger than the openings of the first, second and third membranes, should carry the charge thereon, and should have the ability to immobilize a large quantity of water up to or above 1000 times of the colloid's own weight. The colloid polymer may include hyaluromac acid, as well as any analog thereof.

Instead of (or in addition to) the colloid polymer molecules, the subject system may use suitable nanowire arrays which function as nanoscale generators which convert mechanical energy of fluid flow, movements of the system elements, acoustic or ultrasonic vibrations into electrical energy to create charged nanowire arrays.

Viewed from another aspect, the present invention is envisioned as a method for partial desalination of a concentrated salt solution to obtain a diluted salt solution. The method comprises the steps of:

filling central, first and second chamber compartments of the desalination unit with a concentrated salt solution to be desalinated, and placing the charged colloidal substance in the central chamber compartment to form a colloid salt solution with negatively charged colloid molecules; and opening a first membrane between the first and central compartments to create fluid exchange between the concentrated salt solution in the first compartment and the colloid salt solution in the central chamber compartment.

The method further includes the steps of:

closing the first membrane between the first and central compartment upon reaching ionic and pressure equilibrium between the concentrated salt solution and the colloid salt solution, opening the second membrane between the second and central chamber compartments to permit water absorption from the concentrated salt solution in the second compartment to dilute the colloid salt solution in the central chamber compartment, and closing the second membrane.

Further, the method includes the step of opening a third membrane at the bottom of the central chamber compartment to discharge diluted salt solution from the central chamber compartment.

In order to maintain the cyclical operation, after the step of closing the first membrane between the first and central compartments upon reaching ionic and pressure equilibrium, the first compartment is emptied and filled with the original concentrated salt solution.

After the step of receiving the diluted colloidal salt solution in the central chamber compartment and closing the second membrane, the second chamber compartment is emptied and filled with the original concentrated salt solution. Alternatively, the original salt solution may continually flow through the second chamber compartment.

The previously described method steps are cyclically repeated to produce a diluted salt solution at the output of the central chamber compartment.

Further, the method contemplates cascading the desalination units which contain the negatively charged colloid polymer in their central chamber compartments, and filling the central, first and second chamber compartments of each desalination unit with a diluted salt solution from an upstream desalination unit.

These and other objects of the present invention will be readily available upon reading the following detailed description of the preferred embodiments in conjunction with the Drawings Figures.

DETAILED DESCRIPTION OF THE PREFERRED EMBODIMENT

Figure 1:
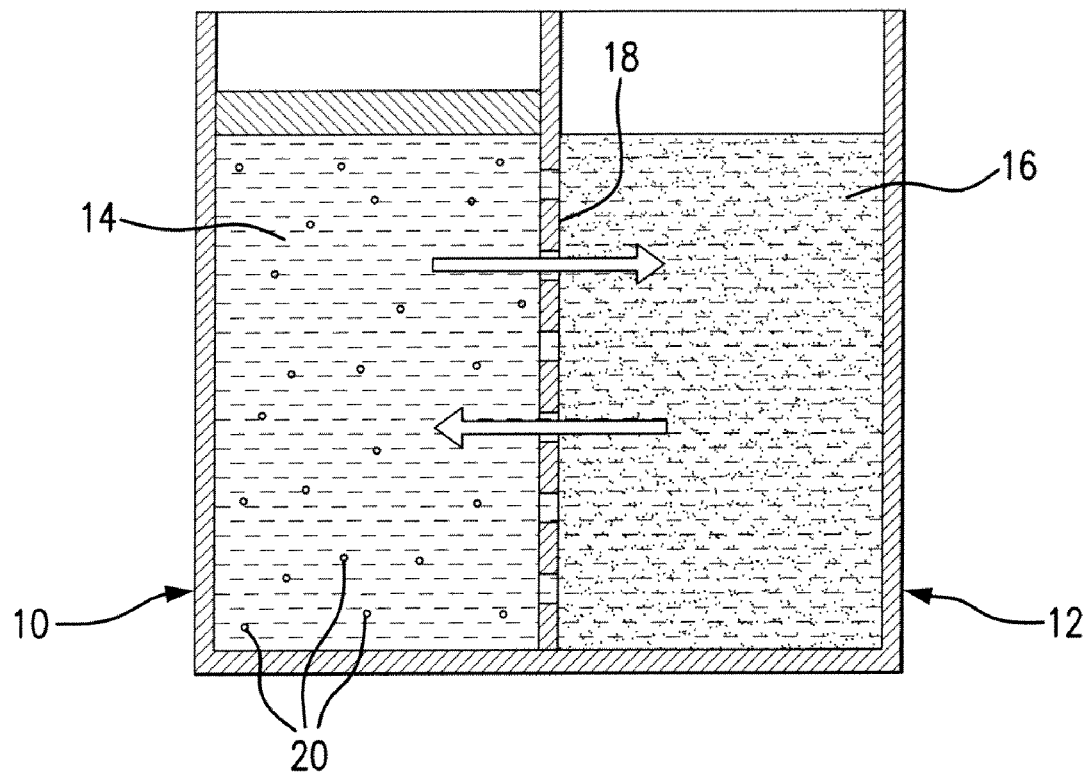
FIG. 1 describes a two-chamber system demonstrating a Gibbs-Donnan effect.
Figure 2:
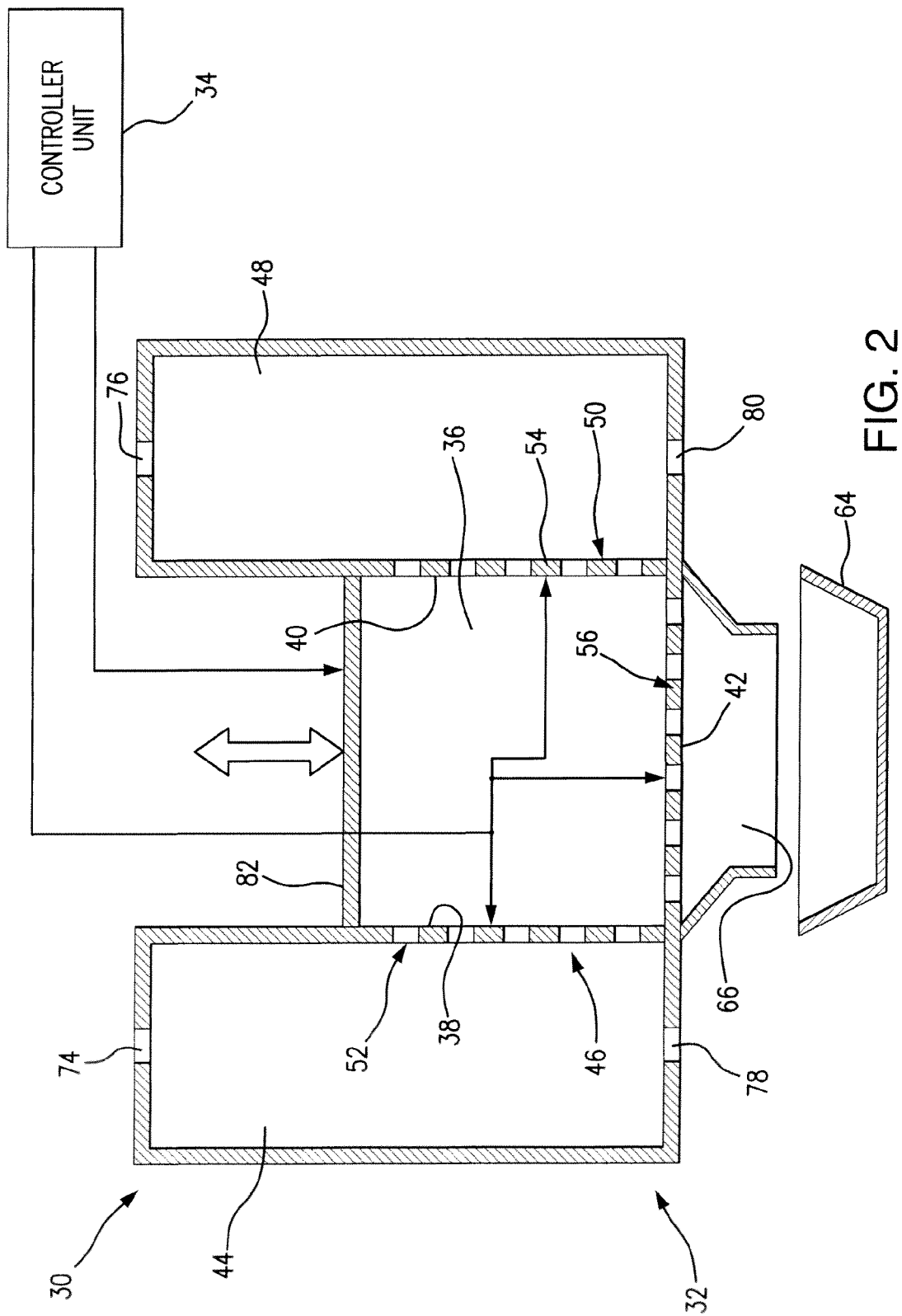
FIG. 2 is a schematic representation of the desalination unit of the present invention.

Referring to FIGS. 2, 3A-3C, and 4, a desalination system 30 of the present invention includes one or a plurality of desalination units 32 and a controller unit 34 which controls operation of the desalination unit(s) 32. Although the present system will be further described in relation to the salt solution containing NaCl, it should be understood that the principles of the subject system and method are also applicable to desalination of salt solutions containing salts different from NaCl.

Each desalination unit 32 includes a central chamber compartment 36, which has two opposite sides 38 and 40, and a bottom 42 extending therebetween. The desalination unit 32 further includes a peripheral chamber compartment 44 which is disposed at the side 38 of the central chamber compartment 36 and which has a fluid passage 46 formed therebetween. The peripheral chamber compartment 44 is substantially of the same volume as the central chamber compartment 36 for the purposes described in detail further herein.

At an opposite side 40 of the central chamber compartment 36, a peripheral chamber compartment 48 is formed which is in fluid communication with the central chamber compartment 36 through a fluid passage 50 provided therebetween.

The central chamber compartment 36 is separated from the chamber compartment 44 through a reinforced semi-permeable membrane 52 which is permeable to salt (NaCl) and water. The chamber compartment 48 is separated from the central chamber compartment 36 through a semi-permeable membrane 54 which is permeable to water, but not permeable to salt. A third semi-permeable membrane 56 is positioned at the bottom of the central chamber compartment 36 which is a reinforced membrane permeable to salt and water.

The membranes 52, 54 and 56 may be closed or opened as required by a specific cycle of the system operation (to be further described in detail in following paragraphs) through a closing/opening mechanism. The membrane closing/opening mechanism is programmably controlled by the controller unit and may include a variety of mechanisms. For example, it may include a system of reinforcing walls (or thin films) 58, 60 and 62 which may be displaceably disposed in proximity to their respective membranes 52, 54 and 56. For example, the reinforcing walls may be slideably displaced along the plane of the respective membrane for opening the fluid passage therethrough. Alternatively, the reinforcing walls may be displaced perpendicular to the plane of the respective membrane. As an example, the wall 58 may be attached to the membrane 52 in the "closed" state thereof, and may be removed therefrom to open the membrane 52.

In a further alternative embodiment, the membranes 52, 54, 56 may be made as polytetrafluoroethylene (PTFE) reinforced integral multilayered membranes which may be switched between "open" and "closed" states by spreading the layers of the multilayered membrane one from another under the influence of pressure or temperature.

Further, in still another alternative embodiment, the membranes 52, 54 and 56 may be of a circular configuration with their respective walls 58, 60 and 62 rotationally displaceable in both directions about the central axis thereof, thereby opening or closing the membranes.

The opening/closing mechanism for the membranes in the subject desalination unit 32 does not constitute the inventive subject matter and therefore will not be described here in detail. However, it is to be understood that any mechanism suitable for opening or closing the membranes, 52, 54 and 56, as required by the mode of operation of the desalination system 30, is understood within the scope of the protection of the subject invention.

Figure 4:
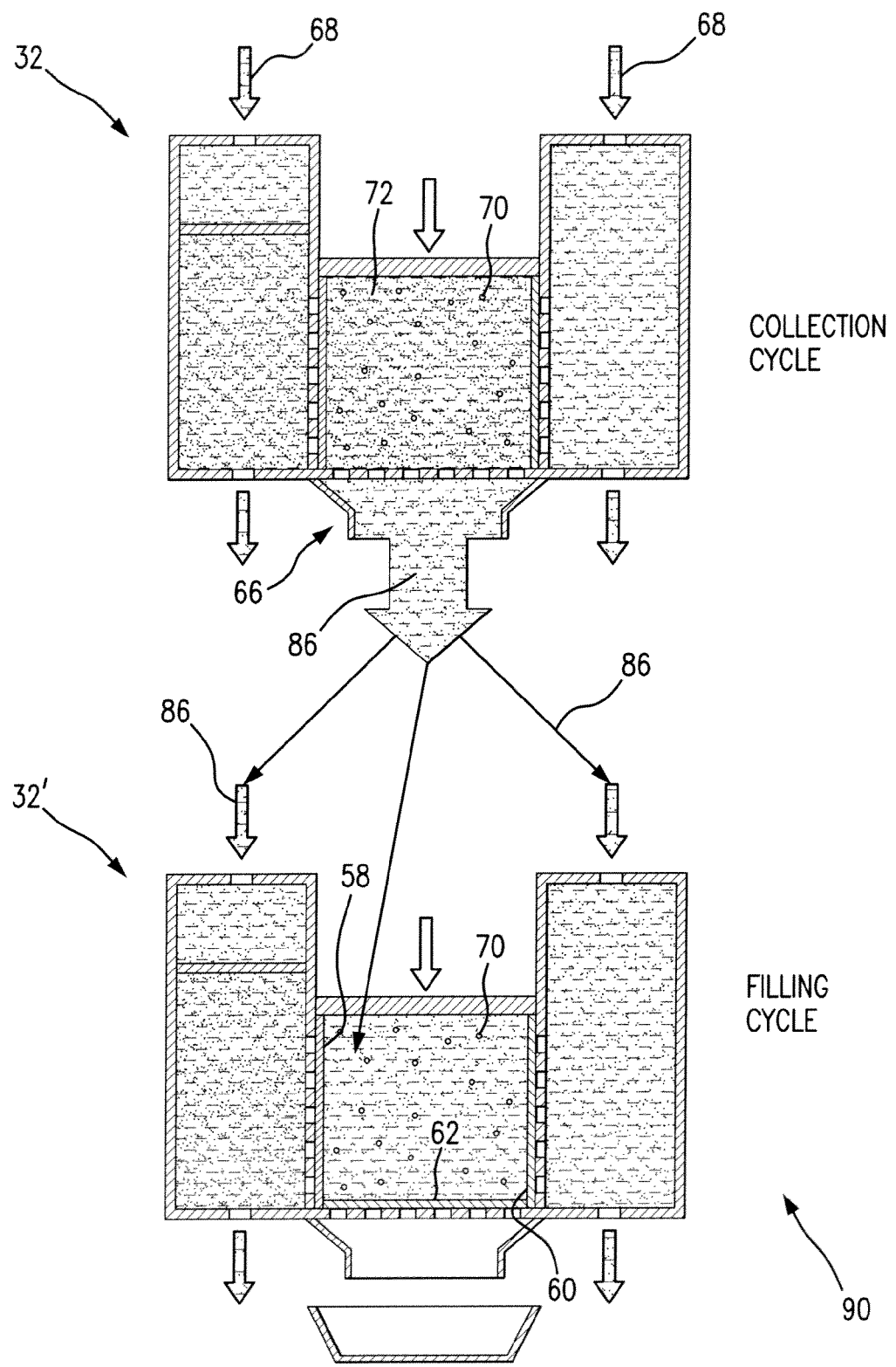
FIG. 4 shows schematically a cascaded embodiment of the desalination system of the present invention.

A collection vessel 64 may be provided to collect fluid expelled from the central chamber compartment 36 through an output 66 thereof. The collection vessel 64 is an optional element of the system 30 and, in case of cascading the desalination units 32, as shown in FIG. 4, it may be omitted so that an input of the downstream desalination unit 32' is directly fluidly connected to the output 66 of the upstream desalination unit 32.

Returning to FIGS. 3A-3C, the desalination unit 32 operates in several modes (also referred to herein as cycles) which include, in sequence, the filling mode, the equilibration mode, the dilution mode, and the collection mode. In the filling mode of operation of the desalination system 30, which precedes the equilibration mode shown in FIG. 3A, the salt solution 68 to be diluted, (or partially desalinated) is inserted into the central chamber compartment 36.

Figure 3A:
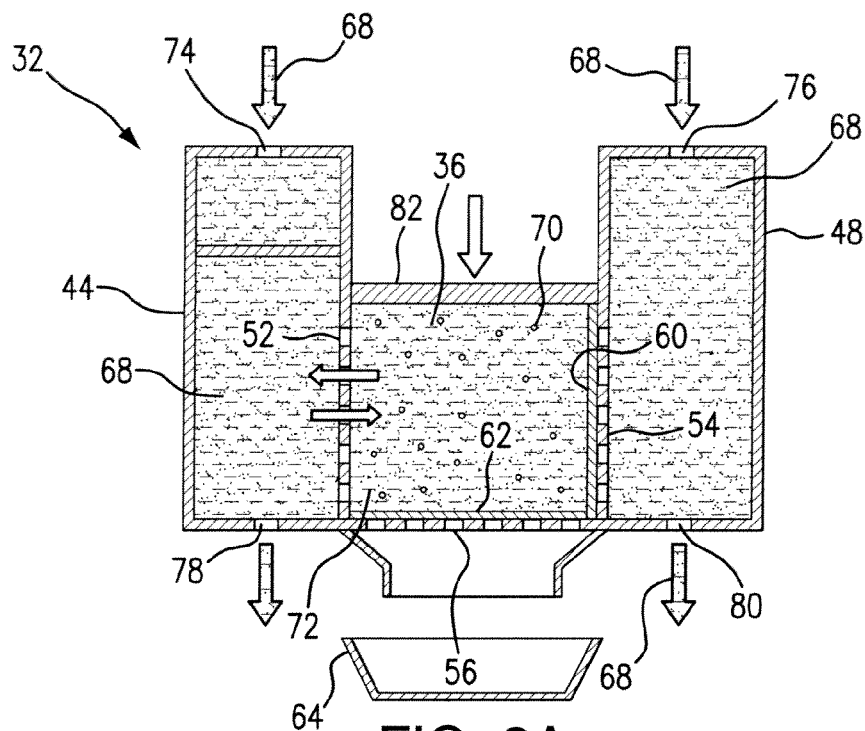
FIG. 3A is a desalination unit of the present invention presented in equilibration mode of operation.

A charged substance is placed in the central chamber compartment. For example, a negatively charged colloid polymer 70 is dissolved (or suspended) in the salt solution 68 in the central chamber compartment 36 to form a colloid salt solution 72. In the filling mode of operation, all membranes 52, 54 and 56 are in their "closed" state as best shown in FIG. 4 for the desalination unit 32'. The peripheral chamber compartment 44 and peripheral chamber compartment 58 are filled with the concentrated salt solution 68 to be dissolved. As shown in FIG. 3A, peripheral chamber compartments 44 and 48 have respective inputs 74 and 76, and outputs 78, 80, respectively.

The central chamber compartment 36 has an upper wall 82 which is vertically displaceable and the position of which may be controlled by the controller unit 34 to regulate the hydrostatic pressure in the central chamber compartment 36 as required by the process.

In the equilibration mode of operation shown in FIG. 3A, the salt and water permeable membrane 52 separating the central chamber compartment 36 from the peripheral chamber compartment 44 is opened, so that the fluid passage 46 is opened, and the mutual exchange of the fluids, e.g. the salt solution 68 from the peripheral chamber compartment 44 and the colloid salt solution 72 from the central chamber compartment 36 takes place.

The membrane 52, although being permeable to salt and water, is not however, permeable to the colloid molecules 70. As the result of the fluid exchange between the chamber compartment 36 and 44 through the salt and water permeable membrane 52, ionic and pressure Gibbs-Donnan equilibrium are allowed to develop between chambers 36 and 44 owing to the Gibbs-Donnan process, as the result of the transfer of fluid which occurs by osmotic pressure across the membrane 52. At ionic and pressure equilibrium, the salt concentration in the central chamber compartment 36 is $C_0$, the volume of the fluid in the central chamber compartment 36 reaches the volume of $V_0$, and the equilibrium hydrostatic pressure balancing the colloid osmotic pressure is $P_0$. The values of $C_0$, $V_0$, and $P_0$ will be presented in further paragraphs.

The equilibrium hydrostatic pressure $P_0$ is maintained at a predetermined level by the controller unit 34 applying pressure to the upper wall 82 of the central chamber compartment 36. This equilibrium hydrostatic pressure is calculated by the Eq. 1 presented in previous paragraphs.

Upon establishment of the ionic and pressure equilibrium between the chamber compartment 36 and 44, the membrane 52 is closed. In this cycle, the output 78 of the peripheral chamber compartment 44 may be opened to empty this compartment, and a new portion of the salt solution 68 may be entered into the peripheral chamber compartment 44 through the input 74 thereof for a further cyclical desalination process.

Figure 3B:
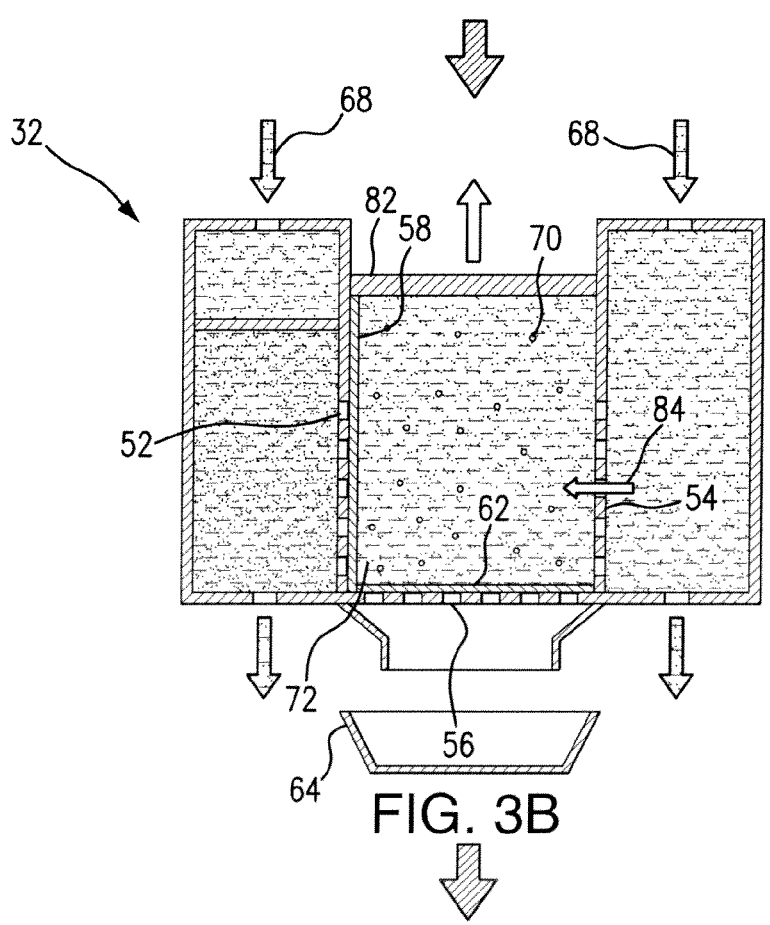
FIG. 3B is a desalination unit of the present invention in the dilution mode of operation.

From the equilibration mode of operation shown in FIG. 3A, the desalination process passes to the dilute mode of operation shown in FIG. 3B in which the controller unit 34 opens the water permeable membrane 54 between the central chamber compartment 36 and the peripheral chamber compartment 48. In this mode of operation, owning to the excess osmotic pressure in the peripheral chamber compartment 48, water enters into the central chamber compartment 36 where the pressure is relaxed. The arrow 84 shows the direction of the waterflow through the membrane 54. As a result of the water transfer in the direction 84, the volume of fluid in the central chamber compartment 36 is allowed to increase causing the vertical upward displacement of the upper wall 82, until the osmotic pressure difference between the peripheral chamber compartment 48 and the central chamber compartment 36 is dissipated.

At this time, the concentration of salt in the central chamber compartment 36 is $C_e$ and the volume of the fluid in the central compartment 36 is $V_e$. In the dilution mode of operation, the salt solution 68 is flowing through the peripheral chamber compartment 48 from the input 76 to the output 80 thereof. Therefore, although the water from the peripheral chamber compartment 48 is absorbed in the central chamber compartment 36, the concentration of salt in the salt solution in the peripheral chamber compartment 48 is not substantially increasing during the dilution mode of operation owing to the continuous supply of the salt solution through the chamber 48.

Having reached a substantial degree of expansion and dilution of the fluid in the central chamber compartment 36, while the membrane 52 between the chambers 36 and 44 is closed, the dilution mode of operation terminates with closing of the membrane 54 between chambers 36 and 48. The diluted solution 85 is thus formed in the central chamber compartment 36.

Figure 3C:
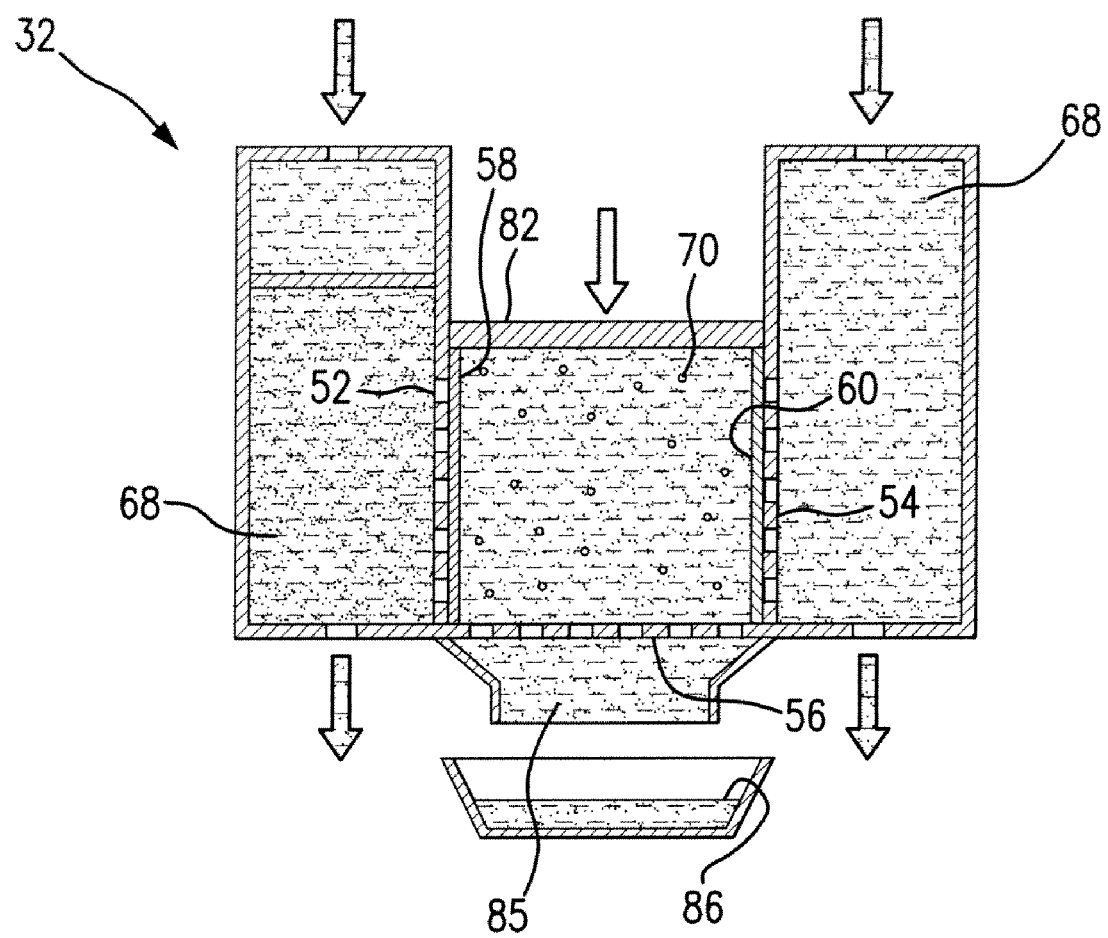
FIG. 3C is a desalination unit of the present invention in the collecting mode of operation.

Further, the desalination system operation passes to the final cycle of the process, e.g., collection mode of operation shown in FIG. 3C, at which the salt and water permeable membrane 56 on the bottom of the central chamber compartment 36 is opened. The hydrostatic pressure on the fluid in chamber 36 causes the diluted fluid 85 which has a salt concentration lower than the original salt concentration of the salt solution 68 to expel into the collection vessel 64, until the original volume of the fluid in the central chamber compartment 36 is restored (the level of the upper wall 82 in FIGS. 3A and 3C is substantially the same). At the same time, the original concentration of the colloid in the central chamber compartment 36 is also restored. A diluted salt solution 86 collected in the collection vessel has a salt concentration lower than the salt concentration of the diluted solution 85 in the central chamber compartment 36 due to the fact that a portion of the cations equivalent to z remain with the colloid due to electrical attraction.

Thus, the full cycle of partial dilution of the salt solution 68 is fulfilled, and by closing the membrane 56 at the bottom of the central chamber compartment 36 to prevent the outflow between the central chamber compartment 36 and the collecting vessel 64, as well as by keeping the membrane 54 between the chambers 36 and 48 closed, the membrane 52 between the peripheral chamber compartment 44 and the central chamber compartment 36 may be opened to allow the Gibbs-Donnan equilibrium process to be reestablished between the chambers 36 and 44, thus restarting the next cycle of the salt solution dilution.

As seen from the Eq. 1 for equilibrium pressure presented supra herein, the higher the total number z of the colloidal charges in the system, the higher the equilibrium pressure $P_0$ may reach. The subject technique requires industrial synthesis of a charged polymer with high negative electric charge density. It should be noted that there are limits of how high the z value in a solution can reach. One of these limitations is the distance between negative charges within the molecule, as closely spaced charges diminish the molecule's stability. Another limitation concerns the phenomenon of flocculation out of solution or suspension of high concentration of the colloid.

The extent of dilution which may be obtained in the desolation unit 32 is presented in Table 1.

TABLE 1

| 1<br>z/0.3 M | 2<br>$V_e/V_0$ (%) | 3<br>$C_e/C_o$ | 4<br>$C_d/C_o$ | 5<br>Atm |
|---|---|---|---|---|
| 0.1 | 100.1 | .999 | .951 | 0.8 |
| 0.2 | 100.5 | .995 | .905 | 1.4 |
| 0.4 | 102.0 | .981 | .820 | 2.6 |
| 0.6 | 104.4 | .958 | .744 | 3.8 |
| 0.8 | 107.7 | .928 | .677 | 4.8 |
| 1.0 | 111.8 | .894 | .618 | 5.9 |

Table 1 presents the effect of various concentrations of the charged colloid on osmotic pressure of the salt solution in which the salt concentration is similar to that of sea water (approximately 3.5% of NaCl). In Table 1, the value of z, i.e. the total number of colloidal charges in the colloidal salt solution, is shown in column 1 in relation to a fixed concentration of salt of 0.3M (which is the approximate $Na^+$ ion concentration of sea water). Column 2 shows the percentage expansion ($V_e/V_o$) of the volume of the fluid in the central chamber compartment at the point when entry of water from the peripheral chamber compartment 48 increased the fluid volume until osmotic pressures between chamber 36 and 48 has equalized on both sides of the membrane 34, as shown in FIG. 3B. Column 3 indicates ratios $C_e/C_o$ of the concentration $C_e$ of the expanded fluid 85 versus its original concentration ($C_o$). In column 4, the salt concentration $C_d$ of the fluid 86 which is collected in the collection vessel 64 versus the original fluid concentration $C_o$ in the central chamber compartment 34 is presented.

As presented in Columns 3 and 4, the fluid 86 expelled from the central chamber compartment 36 is more dilute than the expanded fluid 85. This difference in concentrations is due to the fact that part of the solute, namely the quantity of cations equivalent to z, remains with the colloid in the central chamber compartment 36 when the excess of the diluted solution is expelled from the system.

The values in column 5 of the Table 1 show the hydrostatic pressure in Atm at 20° C. necessary to expel the dilute fluid 85 from chamber 36 into the collecting vessel 64.

The subject desalination technique requires chemical syntheses and manufacture of a charged colloid that best fulfills the requirements of optimal operation. This colloid may be used repeatedly and is not consumed during the desalination procedure.

The charged colloid polymer 70 used in the subject desalination unit 32 may include the colloid chosen from the naturally occurring macromolecules such as, for example, hyaluronic acid or hyaluronate found in wide distribution in the animal world as a substantial component of the subcutaneous connective tissue. It is a polymer built of repeating disaccharide units of D-glucuronic acid-N-acetyl-N-glucosamine. The colloid macromolecule has a variable molecular weight approximately and exceeding 1,000,000 Dalton, and every subunit of 405 Dalton carries one unit negative charge. Hyaluronate also has the quality of mechanically immobilizing a large quantity (up to 1000 times its own weight) of water. Any analogs of the presented colloids are also understood in the scope of the present inventions.

Alternatively, the charged colloid particles in the subject system may be substituted for by a suitable electric 3-dimensional nanowire arrays in which charges may be applied without the limiting factors that set a limit on charge density on a colloid molecule. These limitations, as presented supra herein, concern the molecule's stability which may be diminished if the negative charges within the molecule are closely spaced, and possible flocculation out of suspension of high concentration of the colloid. The nanowire arrays may function as nanogenerators which convert mechanical energy into electricity, thus charging the nanowires. The mechanical energy may come for example from acoustic or ultrasonic vibrations, system parts movements, as well as fluid flow in the system.

An important feature of the desalination process is that the transfer of water occurs by osmotic pressure across the membrane 54. This process promises to be low damaging and low fouling to the membrane. The dilute fluid 85 is then driven by more moderate (as presented in column 5 in the Table) hydrostatic pressure through the membrane 56 which retains only the colloid.

The energy needs and costs of the subject desalination system and process may include synthesis of the charged colloid, building and maintaining the desalination unit, and providing supplies for continuous function. It is important to note that in the dilute mode of the operation, the transfer of water is driven by osmotic pressure which is an energetically downhill process which does not require any additional energy supply.

The desalination process presented supra, is not believed to deliver salt free water. However, by cascading a number of the subject desalination units fluid collected as a result of operation of the upstream desalination unit may be subjected to further treatment in a downstream desalination unit.

Referring to FIG. 4, the cascaded desalination system 90 includes a plurality of desalination units 32, 32', etc. which are cascaded each with the other in the desalination chain. The output 66 of the upstream desalination unit 32 in its collection mode of operation, is coupled to the input of the downstream desalination unit 32' in its filling mode of operation, for further dilution of the partially diluted salt solution 86 produced in the desalination unit 32.

Although only two desalination units 32 and 32' are presented in FIG. 4, any number of desalination units may be cascaded as required by a specific application of the system. The specimens of fluid so obtained may be further either utilized directly for purposes tolerating certain degree of salinity, or subjected to other desalination procedures which may be economically more feasible, than those which are applied directly to high concentration salt solutions. The desalination system of the present invention may operate in continuous cycles which, when considered in conjunction with the potential avoidance of fouling of the membranes, makes the operation of the subject desalination system highly economically feasible.

The values presented in Table 1 were calculated based on the following principals:

In column 2, the quantity q is defined as:

$$q = V_e/V_0 \quad (Eq.\ 2)$$

where in the dilute cycle (shown in FIG. 3B), $V_0$ is the volume of chamber compartment 36 before expansion, and $V_e$ is the volume after expansion.

With reference to Van Hoff analogy of ideal gas, $$P_0 V_0 \approx P_e V_e \quad (Eq.\ 3)$$

where $P_0$ and $P_e$ are the original and expanded osmotic pressures.

In Hitchcook's (Eq. 1), e.g., $P=RT[z/n+(z^2+4x^2)^{1/2}-2x]$, presented supra, the following approximations are made: since z/n is small, it is ignored, thus $$C_0 = (z^2 + 4x^2)^{1/2} \quad (Eq.\ 4)$$

and, after expansion in the dilute cycle $C_e = C_0/q = 2x$ (Eq. 5)

therefore, $q = (z^2 + 4x^2)^{1/2}/2x$ (Eq. 6), where q is a measure of both expansion and dilution of concentration (Eqs. 2 and columns 2 and 3 of Table 1.

Values in column 4 of the Table 1 were calculated by finding the Cl concentration in the colloid solution vs. the NaCl concentration that satisfies the requirement of the equality of the ion $[Na^+] \times [Cl^-]$ products in the presence of the colloid charges as is indicated in Column 1 of Table 1. This $[Cl^-]$ concentration was then doubled to arrive at the concentration of the salt solution that may be mobilized by pressure from the colloidal salt solution.

Values in column 5 of Table 1 were calculated by first calculating the increased salt concentration in the chamber 36 after its volume was restored, followed by calculating the colloid osmotic pressure difference between that salt concentration and the concentration of the dilute salt solution which was forced through the membrane 56. The value of RT is taken to be 24.0489 at 20° C. for the magnitude of Atm in column 5.

The results of experimentations approximated the calculated values presented in Table 1.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is being claimed is:

1. A method for partial desalination of a concentrated salt solution to obtain a diluted salt solution, comprising the steps of:
   (a) providing at least one desalination unit, including:
      a central chamber compartment having oppositely disposed first and second sides, and a bottom extending between said first and second sides,
      a first chamber compartment located at said first side of said central chamber compartment,
      a second chamber compartment located at said second side of said central chamber compartment, and
      a system of membranes including a first membrane installed between said central and first chamber compartments, and a second membrane installed between said central and second chamber compartments, wherein said first membrane is permeable substantially to water and salt, and wherein said second membrane is permeable substantially exclusively to water;
   (b) placing a charged substance in said central chamber compartment;
   (c) filling said central, first and second chamber compartments with a concentrated salt solution (SS) to be desalinated, wherein a salt solution containing said charged substance is formed in said central chamber compartment;
   (d) opening said first membrane between said first and central chamber compartments, thereby creating fluid exchange between said chamber concentrated SS in said first compartment and said salt solution containing said charged substance in said central chamber compartment;
   (e) closing said first membrane between said first and central chamber compartments upon reaching ionic and pressure equilibrium between said concentrated SS and said salt solution containing said charged substance;
   (f) opening said second membrane between said second and central chamber compartments, thereby permitting water absorption into said central chamber compartment from said concentrated SS in said second chamber compartment, thereby diluting said salt solution containing said charged substance in said central chamber compartment, and thereby obtaining a diluted SS therein;
   (g) closing said second membrane; and
   (h) discharging said diluted SS from said central chamber compartment through said bottom thereof.

2. The method of claim 1, further comprising the steps of:
   in said step (a), installing a third membrane at said bottom of said central compartment, wherein said third membrane is substantially permeable to water and salt, and
   after said step (g), further including the step (i) opening said third membrane to permit discharge of said diluted SS in said step (h).

3. The method of claim 2, further comprising the step of: after said step (h), closing said third membrane.

4. The method of claim 1, further comprising the steps of: after said step (e), emptying said first compartment, and (j) filling the same with said concentrated SS.

5. The method of claim 4, further comprising the steps of: after said step (g), emptying said second compartment, and (k) filling the same with said concentrated SS.

6. The method of claim 4, further comprising the step of: in said step (f), flowing said concentrated SS through said second chamber compartment.

7. The method of claim 5, further comprising the step of: cyclically repeating said steps (d), (e), (j), (f), (g), (i) and (h) in sequence.

8. The method of claim 1, wherein said charged substance is selected from a group consisting of: colloid polymer molecules, hyaluronic acid, analogs of said hyaluronic acid, nanowire arrays, nanowire power generating arrays, and combinations thereof, and
   wherein said first, second and third membranes are not permeable to said charged substance.

9. The method of claim 8, further comprising the steps of: in said step (a), providing a collecting vessel beneath said bottom of said central compartment, and in said step (h) collecting said diluted SS in said collecting vessel.

10. The method of claim 9, wherein said concentrated SS is sea water, wherein a ratio of a total number of colloidal charges in the salt solution containing said charged substance to a concentration of salt in the sea water of 0.3 M ranges between 0.1 and 1.0, wherein a percentage expansion Ve/Vo of the fluid volume Vo in said central chamber compartment in said step (e) to the fluid volume Ve in said central chamber compartment in said step (g) ranges from 100.1% to 111.8%, wherein a ratio of salt concentration Ce in said central chamber compartment in said step (g) to the original salt concentration Co in said step (e) ranges between 0.999 and 0.894, wherein a ratio of salt concentration Cd in said diluted SS collected in said collecting vessel to Co in said step (e) ranges between 0.951 and 0.618, and wherein a hydrostatic pressure necessary to discharge the diluted SS from said central chamber compartment ranges between 0.8 Atm and 4.9 Atm.

11. The method of claim 10, further comprising the steps of:
in said step (e), controllably maintaining said hydrostatic pressure in said central chamber compartment.

12. The method of claim 9, further comprising the steps of providing at least one additional said desalination unit having said charged substance in said central compartment thereof, fluidly connecting an input thereof to said central chamber compartment of said at least one desalination unit,
filling said central, first and second chamber compartments of said at least one additional desalination unit with said diluted SS from said central chamber compartment of said at least one desalination unit, and
repeating said steps (d)-(h).

13. A system for desalination of a salt solution, comprising:
at least one desalination unit, including:
a central chamber compartment having an input and output,
a charged substance disposed in said central chamber compartment,
a first chamber compartment in a fluid communication with said central chamber compartment through a first fluid passage formed therebetween,
a second chamber compartment in a fluid communication with said central chamber compartment through a second fluid passage formed therebetween,
a first membrane permeable substantially exclusively to salt and water, said first membrane being installed between said first and central chamber compartments to substantially cover said first fluid passage formed therebetween,
a second membrane permeable substantially exclusively to water, said second membrane being installed between said second and central chamber compartments to substantially cover said second fluid passage formed therebetween; and
a controller nit operationally coupled to said first and second membranes to control opening and closing thereof;
wherein said at least one desalination unit cyclically operates in sequential filling, equilibration, dilution, and collection modes of operation,
wherein in said filling mode of operation, said first and second membranes are closed, and said central, first and second chamber compartments are filled with a salt solution (SS) to be diluted, and wherein a salt solution containing said charged substance is formed in said central chamber compartment;

wherein in said equilibration mode of operation following said filling mode of operation, said first membrane is opened, said second membrane is closed, and ionic and pressure equilibrium is established between said SS in said first chamber compartment and said salt solution containing said charged substance in said central chamber compartment through said first fluid passage;

wherein in said dilution mode of operation following said equilibration mode of operation, said first membrane is closed, said second membrane is opened, and said salt solution containing said charged substance in said central chamber compartment absorbs water from said SS in said second chamber compartment through said second membrane, thereby expanding in volume and diluting said SS component of said salt solution containing said charged substance in said central chamber compartment; and wherein in said collection mode of operation following said dilution mode of operation, said first and second membranes are closed, and a diluted SS is expelled through said output of said central chamber compartment.

14. The apparatus of claim 13, further comprising:
a third membrane permeable substantially exclusively to salt and water, said third membrane being installed at said output of said central chamber compartment, said controller unit being further operationally connected to said third membrane to close the same in said filling, equilibration, and dilution modes of operation, and to open said third membrane in said collection mode of operation.

15. The apparatus of claim 14, further comprising a system of displaceable walls including:
a first wall disposed between said first and central chamber compartments in proximity to said first membrane, a second wall disposed between said second and central chamber compartments in proximity to said second membrane, and a third wall disposed at a bottom of said central chamber compartment in proximity to said third membrane,
wherein said controller unit is operationally coupled to said first, second, and third walls for a controlled displacement thereof to control "opened" and "closed" states of said first, second and third membranes, respectively, in a predetermined order.

16. The apparatus of claim 13, further comprising an upper wall disposed at the top of said central chamber compartment and vertically displaceable in upward direction in said dilution mode of operation and in downward direction in said collection mode of operation.

17. The apparatus of claim 13, further comprising a collecting vessel fluidly connected to said output of said central chamber compartment to collect said diluted SS expelled therefrom.

18. The apparatus of claim 13, further comprising a plurality of said at least one desalination units cascaded each to the other, wherein said diluted SS expelled through said output of said central chamber compartment of an upstream desalination unit of said cascaded plurality thereof is filled into said central, first and second chamber compartments of a respective downstream desalination unit of said plurality thereof.

19. The apparatus of claim 13, wherein said charged substance is selected from a group consisting of: a colloid polymer, negatively charged hyaluronic acid, analogs of said hyaluronic acid, nanowire arrays, nanowire power generating arrays, and combinations thereof.

20. The apparatus of claim 19, wherein said controller unit is operationally coupled to said upper wall to maintain an equilibrium pressure P in said central chamber compartment in accordance with an equation:

$$P=RT\,[z/n+(z^2+4x^2)^{1/2}-2x],$$

where
- R is the gas constant, $R=8.31451.1$ $JK^{-1}$ $mol^{-1}$,
- T is absolute temperature of the colloid salt solution,
- x is the equivalent concentration of $Na^+$ or $Cl^-$ ions of said salt solution,
- n is the number of negative charges of each negatively charged colloid molecule,
- z is the total number of charges in the salt solution containing said charged substance, and
- z/n is the molar concentration of the colloid.

* * * * *